(12) United States Patent
Sun et al.

(10) Patent No.: US 11,602,735 B1
(45) Date of Patent: *Mar. 14, 2023

(54) TWO STAGE CATALYTIC PROCESS FOR PYROLYSIS OIL UPGRADING TO BTEX

(71) Applicant: Saudi Arabian Oil Company, Dhahran (SA)

(72) Inventors: Miao Sun, Dhahran (SA); Sohel K. Shaikh, Dhahran (SA); Ibrahim A. Abba, Dhahran (SA); Noor Al-Mana, Dhahran (SA); Ke Zhang, Soneham, MA (US); Zhonglin Zhang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 17/519,758

(22) Filed: Nov. 5, 2021

(51) Int. Cl.

| | |
|---|---|
| *C10G 69/02* | (2006.01) |
| *B01J 8/02* | (2006.01) |
| *B01J 8/08* | (2006.01) |
| *B01J 23/83* | (2006.01) |
| *B01J 23/00* | (2006.01) |
| *B01J 29/78* | (2006.01) |
| *C10G 69/06* | (2006.01) |

(52) U.S. Cl.
CPC ............. *B01J 23/83* (2013.01); *B01J 8/0285* (2013.01); *B01J 8/087* (2013.01); *B01J 23/002* (2013.01); *B01J 29/7815* (2013.01); *C10G 69/06* (2013.01); *B01J 2208/00539* (2013.01); *C10G 2400/30* (2013.01)

(58) Field of Classification Search
None
See application file for complete search history.

(56) References Cited

U.S. PATENT DOCUMENTS

| | | |
|---|---|---|
| 10,751,709 B1 | 8/2020 | Sun et al. |
| 10,751,710 B1 | 8/2020 | Sun |
| 10,835,894 B1 | 11/2020 | Sun et al. |

(Continued)

FOREIGN PATENT DOCUMENTS

| | | | |
|---|---|---|---|
| WO | WO-2017093056 A1 | * | 6/2017 |
| WO | 2018127812 A1 | | 7/2018 |
| WO | WO-2019197987 A1 | * | 10/2019 |

OTHER PUBLICATIONS

Guerzoni et al. "Catalytic Cracking of a Hydrocarbon Mixture on Combinations of HY and HZSM-5 Zeolites" Journal of Catalysis 139, 289-303 (1993), 15 pgs.

(Continued)

*Primary Examiner* — Philip Y Louie
(74) *Attorney, Agent, or Firm* — Dinsmore & Shohl LLP (57) ABSTRACT

In accordance with one or more embodiments of the present disclosure, a multi-stage process for upgrading pyrolysis oil comprising polyaromatic compounds to benzene, toluene, ethylbenzene, and xylenes (BTEX) includes upgrading the pyrolysis oil in a slurry-phase reactor zone to produce intermediate products, wherein the slurry-phase reactor zone comprises a mixed metal oxide catalyst; and hydrocracking the intermediate products in a fixed-bed reactor zone to produce the BTEX, wherein the fixed-bed reactor zone comprises a mesoporous zeolite-supported metal catalyst.

15 Claims, 2 Drawing Sheets

(56) References Cited

U.S. PATENT DOCUMENTS

| | | | | |
|---|---|---|---|---|
| 2014/0275666 | A1* | 9/2014 | Bauer | C10G 45/42 |
| | | | | 585/240 |
| 2017/0121613 | A1* | 5/2017 | Oprins | C10G 65/10 |
| 2019/0078029 | A1* | 3/2019 | Johnson | C10G 67/02 |
| 2021/0001320 | A1 | 1/2021 | Sun | |
| 2021/0009907 | A1 | 1/2021 | Frecon et al. | |

OTHER PUBLICATIONS

Jimenez-Cruz et al. "Molecular size evaluation of linear and branched paraffins from the gasoline pool by DFT quantum chemical calculations" Elsevier, Fuel 83 (2004) 2183-2188, 7 pgs.

Kim et al. "Novel Ni2P/zeolite catalysts for naphthalene hydrocracking to BTX" Elsevier, Catalysis Communications 45 (2014) 133-138, 6 pgs.

Kim et al. "Morphology effect of B-zeolite supports for Ni2P catalysts on the hydrocracking of polycyclic aromatic hydrocarbons to benzene, toluene, and xylene" Elsevier, Journal of Catalysis 351 (2017) 67-78, 12 pgs.

Kondoh et al. "Effects of H2O Addition on Oil Sand Bitumen Cracking Using a CeO2—ZrO2—Al2O3—FeOx Catalyst" Energy Fuels 2016, 30, 10358-10364, 7 pgs.

Kondoh et al. "Upgrading of oil sand bitumen over an iron oxide catalyst using sub- and super-critical water" Elsevier, Fuel Processing Technology 145 (2016) 96-101, 6 pgs.

Kondoh et al. "Catalytic cracking of heavy oil over TiO2—ZrO2 catalysts under superheated steam conditions" Elsevier, Fuel 167 (2016) 288-294, 7 pgs.

Lapinas et al. "Catalytic Hydrogenation and Hydrocracking of Fluorene: Reaction Pathways, Kinetics, and Mechanisms" Ind. Eng. Chem. Res. 1991, 30, 42-50, 9 pgs.

Leite et al. "Hydrocracking of phenanthrene over bifunctional Pt catalysts" Elsevier, Catalysis Today 65 (2001) 241-247, 7 pgs.

Lemberton et al. "Catalytic hydroconversion of simulated coal tars" Applied Catalysis A: General, 79 (1991) 115-126, 12 pgs.

Akagi et al. "Explanation of Product Distribution of Hydrocracking Reaction of Aromatic Hydrocarbons with Nickel-Loaded Zeolites Based on CAMD Study on Interaction between Zeolites and Substrates" Energy & Fuels 1995, 9, 435-438, 4 pgs.

Park et al. "Hydro-conversion of 1-methyl naphthalene into (alkyl)benzenes over alumina-coated USY zeolite-supported NiMoS catalysts" Elsevier, Fuel 90 (2011) 182-189, 8 pgs.

Park et al. "Mild hydrocracking of 1-methyl naphthalene (1-MN) over alumina modified zeolite" Elsevier, Journal of Industrial and Engineering Chemistry 19 (2013) 627-632, 6 pgs.

Tailleur et al. The effect of aromatics on paraffin mild hydrocracking reactions (WNiPd/CeY—Al2O3), Elsevier, Fuel Processing Technology 89 (2008) 808-818, 11 pgs.

Notification of Transmittal of the International Search Report and the Written Opinion of the International Searching Authority, or the Declaration dated Jan. 18, 2023 pertaining to International application No. PCT/US2022/045739 filed Oct. 5, 2022, pp. 1-12.

\* cited by examiner

TWO STAGE CATALYTIC PROCESS FOR PYROLYSIS OIL UPGRADING TO BTEX

TECHNICAL FIELD

Embodiments of the present disclosure generally relate to petroleum products, and pertain particularly to a process for upgrading pyrolysis oil.

BACKGROUND

Pyrolysis oil or pyrolysis fuel oil is a heavy stream that exits a typical crude oil hydrotreating process as a bottom fraction from the steam cracker. This heavy stream is low in sulfur content but rich in aromatic content. Although these properties may make pyrolysis oil a desirable feedstock for subsequent chemical conversions, traditional upgrading processes for pyrolysis oil are complex and inefficient.

SUMMARY

Pyrolysis oil is normally burned as fuel and not viewed as being of high value. However, with a high amount of aromatics, the relatively cheap pyrolysis oil would be an ideal feedstock for the production of valuable intermediate petrochemicals, such as benzene, toluene, ethylbenzene, and xylenes (BTEX). The BTEX can be then treated to maximize para-xylene, which is a critical building block to produce Purified Terephthalic Acid (PTA), and ultimately polyester. There is, therefore, a continual need for novel upgrading processes for pyrolysis oil that are simplified and more efficient. Embodiments of the present disclosure are directed to such processes.

According to one embodiment, a multi-stage process for upgrading pyrolysis oil comprising polyaromatic compounds to benzene, toluene, ethylbenzene, and xylenes (BTEX) includes upgrading the pyrolysis oil in a slurry-phase reactor zone to produce intermediate products, wherein the slurry-phase reactor zone comprises a mixed metal oxide catalyst; and hydrocracking the intermediate products in a fixed-bed reactor zone to produce the BTEX, wherein the fixed-bed reactor zone comprises a mesoporous zeolite-supported metal catalyst.

Additional features and advantages of the embodiments described herein will be set forth in the detailed description which follows, and in part will be readily apparent to those skilled in the art from that description or recognized by practicing the embodiments described, including the detailed description and the claims which are provided infra.

BRIEF DESCRIPTION OF THE DRAWINGS

The following detailed description of specific embodiments of the present disclosure can be best understood when read in conjunction with the following drawings in which.

Figure (FIG. 1 is diagrammatic view of a system for producing BTEX from a pyrolysis oil feed in accordance with embodiments disclosed herein.

DETAILED DESCRIPTION

As used herein, the term "hydrocarbon oil" or "hydrocarbon feedstock" refers to an oily liquid composed mostly of a mixture of hydrocarbon compounds. Hydrocarbon oil may include refined oil obtained from crude oil, synthetic crude oil, bitumen, oil sand, shale oil, or coal oil. The term "refined oil" includes, but is not limited to, vacuum gas oil (VGO), depolyaromatized oil (DAO) or demetallized oil (DMO) obtained from a depolyaromatization process, light and/or heavy coker gas oil obtained from a coking process, cycle oils obtained from an FCC process, and gas oil obtained from a visbreaking process.

As used herein, the term "hydrocarbon" refers to a chemical compound composed entirely of carbon and hydrogen atoms. An expression such as "$C_x$-$C_y$ hydrocarbon" refers to a hydrocarbon having from x to y carbon atoms. For instance, a $C_1$-$C_5$ hydrocarbon includes methane, ethane, propane, the butanes, and the pentanes.

As used herein, the term "polyaromatics" refers to chemical compounds composed of three or more aromatic rings. Polyaromatics having fewer than seven aromatic rings are typically referred to as "polynuclear aromatics" ("PNA"), and polyaromatics having seven to ten aromatic rings are typically referred to as "heavy polynuclear aromatics" ("HPNA").

As used herein, the term "hydrogen/oil ratio" or "hydrogen-to-oil ratio" or "hydrogen-to-hydrocarbon ratio" refers to a standard measure of the volume rate of hydrogen circulating through the reactor with respect to the volume of feed. The hydrogen/oil ratio may be determined by comparing the flow volume of the hydrogen gas stream and the flow volume of the hydrocarbon feed.

As used herein, the term "liquid hourly space velocity" or "LHSV" refers to the ratio of the liquid flow rate of the hydrocarbon feed to the catalyst volume.

As used herein, the term "conduit" includes casings, liners, pipes, tubes, coiled tubing, and mechanical structures with interior voids.

As used herein, the term "decreased content" of a substance means that a concentration of the substance is greater before passing through a stage of the process under examination than it is after passing through the stage. As used herein, the term "increased content" of a substance means that a concentration of the substance is greater after passing through a stage of the process under examination than it is before passing through the stage.

As used throughout this disclosure, "zeolites" may refer to micropore-containing inorganic materials with regular intra-crystalline cavities and channels of molecular dimension. Zeolites generally comprise a crystalline structure, as opposed to an amorphous structure such as what may be observed in some porous materials such as amorphous silica. Zeolites generally include a microporous framework which may be identified by a framework type. The microporous structure of zeolites (e.g., 0.3 nm to 2 nm pore size) may render large surface areas and desirable size-/shape-selectivity, which may be advantageous for catalysis. The zeolites described may include, for example, aluminosilicates, titanosilicates, or pure silicates. In embodiments, the zeolites described may include micropores (present in the microstructure of a zeolite), and additionally include mesopores. As used throughout this disclosure, micropores refer to pores in a structure that have a diameter of greater than or equal to 0.1 nm and less than or equal to 2 nm, and mesopores refer to pores in a structure that have a diameter of greater than 2 nm and less than or equal to 50 nm. Unless otherwise described herein, the "pore size" of a material refers to the average pore size, but materials may additionally include micropores and/or mesopores having a particular size that is not identical to the average pore size.

According to one aspect, a multi-stage process for upgrading pyrolysis oil that contains polyaromatic compounds to BTEX includes upgrading the pyrolysis oil in a slurry-phase reactor zone to produce intermediate products and hydrocracking the intermediate products in a fixed-bed reactor zone. Although the presently described process is not limited to any particular apparatus, FIG. 1 provides a schematic of a system suitable for performing embodiments of the process described herein.

Figure 1:
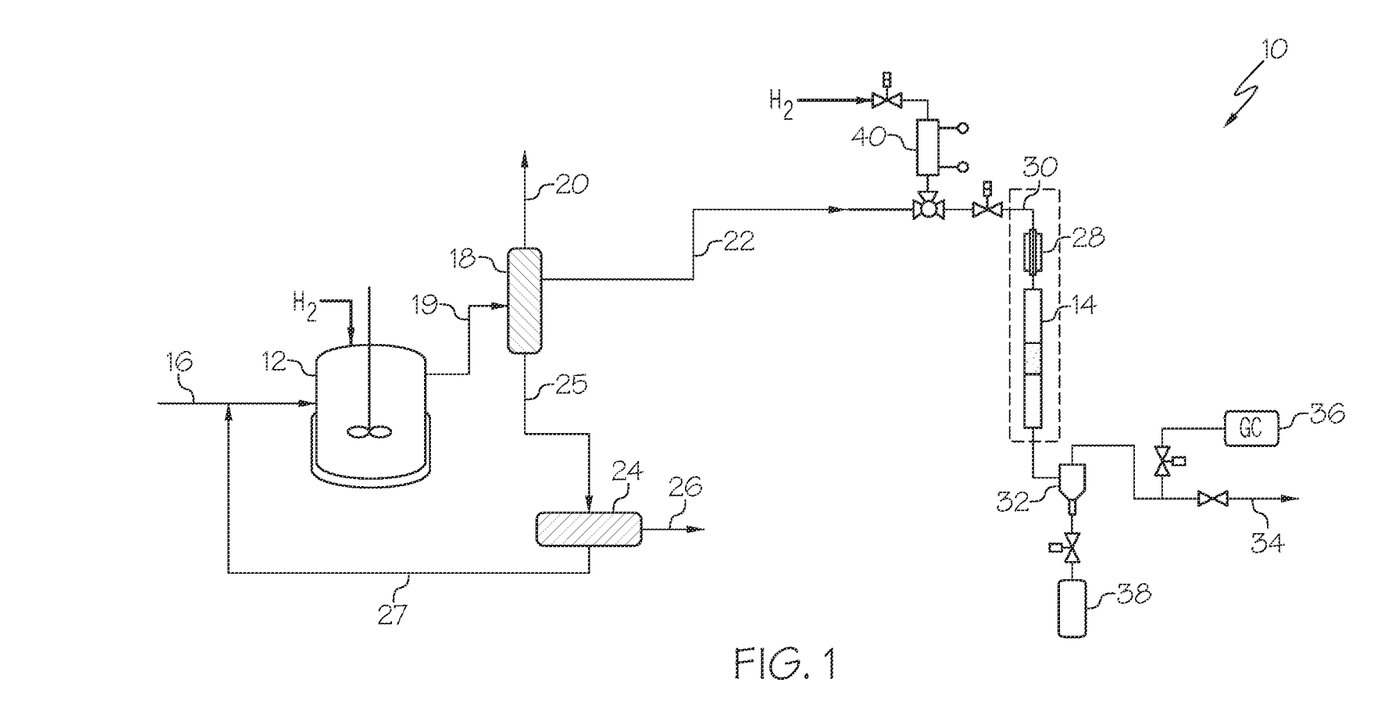

Referring to FIG. 1, upgrading system 10 includes a first reactor 12 and a second reactor 14. In embodiments, first reactor 12 may be a slurry reactor and second reactor 14 may be a fixed-bed reactor.

In operation, a pyrolysis oil feed may be added to the first reactor 12 through conduit 16. First reactor 12 may include a mixed metal oxide catalyst, which is described in more detail below. The pyrolysis oil, optionally with a diluent, may be contacted with the mixed metal oxide catalysts while hydrogen gas is added to the first reactor 12. In embodiments, the mixed metal oxide catalysts may be added simultaneously with the pyrolysis oil feed so that a liquid phase and a solid phase may be mixed to produce the slurry of the slurry reactor. After being allowed to react, the entire slurry may be transferred to separator 18, which is used to separate gas products, liquid products, and used catalyst (solids), via conduit 19. The gas products may be collected via vent 20, the liquid products may be passed to the second reactor 14 via conduit 22, and the solids may be passed to catalyst reclamation unit 24 via conduit 25. In the catalyst reclamation unit 24, the catalyst is separated from the residual polyaromatic compounds and other heavy residues. The catalyst may be collected through conduit 25 and the residue may be recycled back to the pyrolysis oil feed via conduit 27. The collected catalyst may be restored and recycled back to the first reactor 12.

As noted above, the second reactor 14 may be a fixed-bed reactor and may contain a mesoporous zeolite-supported metal catalyst, which is described in more detail below. The liquid products from the first reactor 12 may be contacted with the mesoporous zeolite-supported metal catalysts while hydrogen gas is added to the second reactor 14. Optionally, before being contacted with the mesoporous zeolite-supported metal catalysts, the liquid products from the separator 18 may pass through a heat exchanger 28 and then into the second reactor 14 via conduit 30, as shown in FIG. 1. After being allowed to react, the resulting gaseous products may be separated from the liquid products in separator 32, and then either vented via conduit 34 or analyzed by, for example, gas chromatograph 36. The liquid products may be collected in collector 38. In embodiments, the liquid products may pass through a heat exchanger (not shown) to be cooled prior to being collected in collector 38. Various means of controlling flow rates, such as valves and pump 40, may be used throughout the system where needed.

Having described an embodiment of a system for performing a multi-stage process for upgrading pyrolysis oil, embodiments of the process will be described next.

In embodiments, the pyrolysis oil, a diluent, hydrogen, and the mixed metal oxide catalyst are added to a slurry-phase reactor. The components may be added simultaneously in some embodiments, or at different times in other embodiments. The reactor may be agitated. In embodiments, the agitation may comprise stirring. In other embodiments, the agitation may comprise shaking. In embodiments, the reactor may be agitated via stirring and shaking.

Figure 2:
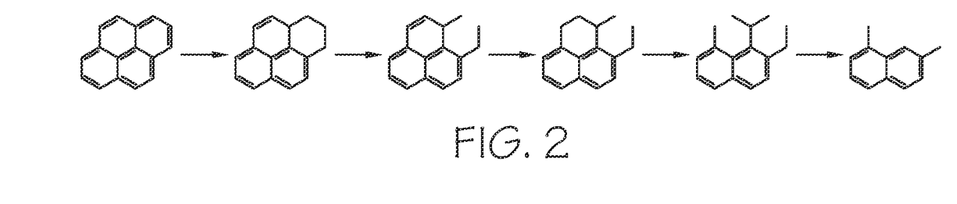
FIG. 2 is a diagram of a cascade of reactions that may occur in the slurry-phase reactor zone in accordance with embodiments described herein.

Contacting the pyrolysis oil with the mixed metal oxide catalyst in the slurry-phase reactor zone causes cracking of polyaromatic compounds, described more fully below, by continuous selective hydrogenation, selective opening of saturated rings, hydro-dealkylation, trans-alkylation, and disproportionation, thereby producing di-aromatic intermediates. An example of a cascade of such reactions is shown in FIG. 2, beginning with pyrene and resulting in a methylated naphthalene. The formation of methylated naphthalene from pyrene is, of course, merely an example of the cascade of reactions, and other starting materials and products are contemplated.

In embodiments, the pyrolysis oil may include one or more polyaromatic compounds. The polyaromatic compounds may include 16 or more aromatic carbon atoms ($C_{16}+$), such as $C_{16}$-$C_{110}$ polyaromatic compounds. For instance, the polyaromatic compounds may be $C_{16}$-$C_{100}$, $C_{16}$-$C_{90}$, $C_{16}$-$C_{80}$, $C_{16}$-$C_{70}$, $C_{16}$-$C_{60}$, $C_{16}$-$C_{50}$, $C_{16}$-$C_{40}$, $C_{16}$-$C_{30}$, $C_{16}$-$C_{20}$, $C_{20}$-$C_{110}$, $C_{30}$-$C_{110}$, $C_{40}$-$C_{110}$, $C_{50}$-$C_{110}$, $C_{60}$-$C_{110}$, $C_{70}$-$C_{110}$, $C_{80}$-$C_{110}$, $C_{90}$-$C_{110}$, or even $C_{100}$-$C_{110}$ polyaromatic compounds. In embodiments, the polyaromatic compounds may include multiple fused aromatic rings, such as 3, 4, 5, 6, 7, 8, 9, or 10 fused benzene rings.

In embodiments, the diluent may be an organic solvent, such as toluene, benzene, or a combination of toluene and benzene. Without intending to be bound by any particular theory, it is believed that the diluent increases the fluidity of the pyrolysis oil feed such that raw pyrolysis oil may have better contact with the mixed metal oxide catalysts than would be possible without the diluent.

Conditions of the reactor, such as flow rate into the reactor, temperature in the reactor, and pressure in the reactor may be varied to control the reaction in the first reactor. In embodiments, the flow rate of the hydrogen gas may be from 15 ml/min to 35 ml/min, such as from 20 ml/min to 35 ml/min, from 25 ml/min to 35 ml/min, from 30 ml/min to 35 ml/min, from 15 ml/min to 30 ml/min, from 15 ml/min to 25 ml/min, or even from 15 ml/min to 20 ml/min. It is envisioned that the flow rate of the hydrogen may be from any of the lower limits disclosed herein to any of the upper limits disclosed herein. Without intending to be bound by any particular theory, it is believed that a hydrogen flow rate into the reactor less than 15 ml/min may not allow sufficient levels of hydrogen into the reactor. However, a hydrogen flow rate greater than 35 ml/min may cause too much hydrogen to circulate within the system, such that an unacceptable amount of the hydrogen is consumed.

In embodiments, the pyrolysis oil, diluent, hydrogen, and mixed metal oxide catalyst are allowed to reside in the slurry-phase reactor for a period of time from 1.5 h to 7.5 h. For example, the components may be allowed to reside in the slurry-phase reactor for from 1.5 h to 7 h, from 1.5 h to 6.5 h, from 1.5 h to 6 h, from 1.5 h to 5.5 h, from 1.5 h to 5 h, from 1.5 h to 4.5 h, from 1.5 h to 4 h, from 1.5 h to 3.5 h, from 1.5 h to 3 h, from 1.5 h to 2.5 h, from 1.5 h to 2 h, from 2 h to 7.5 h, from 2.5 h to 7.5 h, from 3 h to 7.5 h, from 3.5 h to 7.5 h, from 4 h to 7.5 h, from 4.5 h to 7.5 h, from 5 h to 7.5 h, from 5.5 h to 7.5 h, from 6 h to 7.5 h, from 6.5 h to 7.5 h, or even from 7 h to 7.5 h. It is envisioned that the flow rate of the pyrolysis oil and diluent may be from any of the lower limits disclosed herein to any of the upper limits disclosed herein. Without intending to be bound by any particular theory, it is believed that if the components are allowed to reside in the slurry-phase reactor for less than 1.5 h, one or more of the continuous selective hydrogenation, selective opening of saturated rings, hydro-dealkylation, trans-alkylation, and disproportionation may not have sufficient time to proceed to completion. However, unwanted byproducts may be produced if this time is extended beyond 7.5 h.

In embodiments, the first reactor in the slurry-phase reactor zone may be operated at a temperature from 350° C. to 450° C., such as from 360° C. to 450° C., from 370° C. to 450° C., from 380° C. to 450° C., from 390° C. to 450° C., from 400° C. to 450° C., from 410° C. to 450° C., from 420° C. to 450° C., from 430° C. to 450° C., from 440° C. to 450° C., from 350° C. to 440° C., from 350° C. to 430° C., from 350° C. to 420° C., from 350° C. to 410° C., from 350° C. to 400° C., from 350° C. to 390° C., from 350° C. to 380° C., from 350° C. to 370° C., or even from 350° C. to 360° C. It is envisioned that the temperature may be from any of the lower limits disclosed herein to any of the upper limits disclosed herein. Without intending to be bound by any particular theory, it is believed that having a reactor temperature below 350° C. may cause one or more of the continuous selective hydrogenation, selective opening of saturated rings, hydro-dealkylation, trans-alkylation, and disproportionation to proceed too slowly to be commercially viable, but having a reactor temperature above 450° C. may cause one or more of these reactions to proceed too quickly, which may lead to a runaway reaction or premature deactivation of the catalyst.

In embodiments, the first reactor of the slurry-phase reactor zone may be operated at a pressure from 3 MPa to 18 MPa, from 3.5 MPa to 18 MPa, from 4 MPa to 18 MPa, from 4.5 MPa to 18 MPa, from 5 MPa to 18 MPa, from 5.5 MPa to 18 MPa, from 6 MPa to 18 MPa, from 6.5 MPa to 18 MPa, from 7 MPa to 18 MPa, from 7.5 MPa to 18 MPa, from 8 MPa to 18 MPa, from 8.5 MPa to 18 MPa, from 9 MPa to 18 MPa, from 9.5 MPa to 18 MPa, from 10 MPa to 18 MPa, from 10.5 MPa to 18 MPa, from 11 MPa to 18 MPa, from 11.5 MPa to 18 MPa, from 12 MPa to 18 MPa, from 12.5 MPa to 18 MPa, from 13 MPa to 18 MPa, from 13.5 MPa to 18 MPa, from 14 MPa to 18 MPa, from 14.5 MPa to 18 MPa, from 15 MPa to 18 MPa, from 15.5 MPa to 18 MPa, from 16 MPa to 18 MPa, from 3 MPa to 17.5 MPa, from 3 MPa to 17 MPa, from 3 MPa to 16.5 MPa, from 3 MPa to 16 MPa, from 3 MPa to 15.5 MPa, from 3 MPa to 15 MPa, from 3 MPa to 14.5 MPa, from 3 MPa to 14 MPa, from 3 MPa to 13.5 MPa, from 3 MPa to 13 MPa, from 3 MPa to 12.5 MPa, from 3 MPa to 12 MPa, from 3 MPa to 11.5 MPa, from 3 MPa to 11 MPa, from 3 MPa to 10.5 MPa, from 3 MPa to 10 MPa, from 3 MPa to 9.5 MPa, from 3 MPa to 9 MPa, from 3 MPa to 8.5 MPa, from 3 MPa to 8 MPa, from 3 MPa to 7.5 MPa, from 3 MPa to 7 MPa, from 3 MPa to 6.5 MPa, from 3 MPa to 6 MPa, from 3 MPa to 5.5 MPa, or even from 3 MPa to 5 MPa. It is envisioned that the pressure may be from any of the lower limits disclosed herein to any of the upper limits disclosed herein. Without intending to bound by any particular theory, it is believed that a pressure below 3 MPa may be insufficient for one or more of the continuous selective hydrogenation, selective opening of saturated rings, hydro-dealkylation, trans-alkylation, and disproportionation to take place. However, at a pressure above 18 MPa, specialized high-pressure equipment may become necessary, which would increase the cost of performing the reaction.

The slurry-phase reactor includes a mixed metal oxide catalyst. In embodiments, the mixed metal oxide catalyst comprises two or more of $Fe_2O_3$, $ZrO_2$, $CeO_2$, $Al_2O_3$, $TiO_2$, $MoO_3$, $Co_2O_3$, and NiO. In embodiments, the mixed metal oxide catalyst may include from 70 wt. % to 90 wt. % $Fe_2O_3$; from 5 wt. % to 60 wt. % $ZrO_2$; from 1 wt. % to 4 wt. % $CeO_2$; and from 5 wt. % to 10 wt. % $Al_2O_3$, where wt. % is calculated based on the total amount of oxides. In embodiments, the mixed metal oxide catalyst may include from 10 wt. % to 50 wt. % $TiO_2$; from 10 wt. % to 15 wt. % $MoO_3$; from 1 wt. % to 10 wt. % $Co_2O_3$; and from 1 wt. % to 5 wt. % NiO, where wt. % is calculated based on the total amount of oxides.

After the pyrolysis oil is contacted with the mixed metal oxide catalyst, a gaseous phase, a liquid phase, and a solid phase are produced, and may be separated from one another. The gaseous phase may be vented or collected. Conveniently, the gaseous phase may be analyzed prior to collection or venting so the material balance before and after the reaction may be calculated. The solid phase includes the used mixed metal oxide catalyst, which may be recycled to the slurry-phase reactor. The liquid phase includes the intermediate products, which are sent to the fixed-bed reactor zone for further processing. In embodiments, the intermediate products may include di-aromatic compounds and mono-aromatic compounds. Examples of di-aromatic compounds include, but are not limited to, naphthalene and tetralin, both of which may be unsubstituted or substituted with straight-chain or branched hydrocarbon substituents. Examples of mono-aromatic compounds include, but are not limited to, benzene, which may be unsubstituted or substituted with straight-chain or branched hydrocarbon substituents In embodiments, from 90% to 100% of the pyrolysis oil may be converted to the intermediate products. For instance from 90% to 99%, from 90% to 98%, from 90% to 97%, from 90% to 96%, from 90% to 95%, from 90% to 94%, from 90% to 93%, from 90% to 92%, from 90% to 91%, from 91% to 100%, from 92% to 100%, from 93% to 100%, from 94% to 100%, from 95% to 100%, from 96% to 100%, from 97% to 100%, from 98% to 100%, or even from 99% to 100% of the pyrolysis oil may be converted to the intermediate products. It is envisioned that the yield of intermediate products may be from any of the lower limits disclosed herein to any of the upper limits disclosed herein.

The liquid phase may be sent to the second reactor in the fixed-bed reactor zone. In embodiments, an optional heat exchanger may be positioned between the slurry reactor zone and the fixed-bed reactor zone so that the temperature of the liquid phase may be controlled before being introduced into the fixed-bed reactor. The optional heat exchanger may help control the temperature of the liquid intermediate products at a temperature sufficient to avoid condensation of the intermediate products between the slurry reactor and the fixed-bed reactor.

Figure 3:
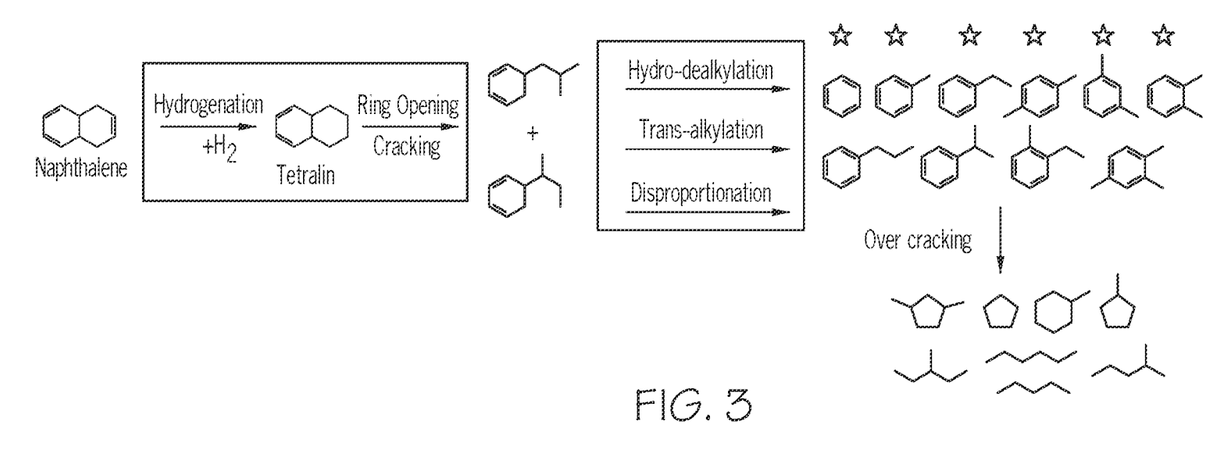
FIG. 3 is a diagram of a cascade of reactions that may occur in the fixed-bed reactor zone in accordance with embodiments described herein.

Contacting the intermediates from the slurry-phase reactor zone with the mesoporous zeolite-supported metal catalysts, described more fully below, produces BTEX by selective hydrogenation, selective opening of the saturated ring, and then further hydro-dealkylation, trans-alkylation, and disproportionation. This cascade of reactions is shown in FIG. 3, beginning with naphthalene and resulting in BTEX. In the event of over-cracking, saturated hydrocarbons may also be produced. The formation of BTEX from naphthalene is, of course, merely an example of the cascade of reactions, and other starting materials are contemplated.

Conditions of the reactor, such as flow rate into the reactor, temperature in the reactor, and pressure in the reactor may be varied to control the reaction in the second reactor. In embodiments, the flow rate of the hydrogen gas may be from 15 ml/min to 35 ml/min, such as from 20 ml/min to 35 ml/min, from 25 ml/min to 35 ml/min, from 30 ml/min to 35 ml/min, from 15 ml/min to 30 ml/min, from 15 ml/min to 25 ml/min, or even from 15 ml/min to 20 ml/min.

It is envisioned that the hydrogen flow rate may be from any of the lower limits disclosed herein to any of the upper limits disclosed herein. Without intending to be bound by any particular theory, it is believed that a hydrogen flow rate into the reactor less than 15 ml/min may not allow sufficient levels of hydrogen into the reactor. However, a hydrogen flow rate greater than 35 ml/min may cause too much hydrogen to circulate within the system, such that an unacceptable amount of the hydrogen is consumed.

In embodiments, the flow rate of the liquid product stream from the slurry-phase reactor zone may be from 0.2 g/min to 1 g/min, such as from 0.3 g/min to 1 g/min, from 0.4 g/min to 1 g/min, from 0.5 g/min to 1 g/min, from 0.6 g/min to 1 g/min, from 0.7 g/min to 1 g/min, from 0.8 g/min to 1 g/min, from 0.9 g/min to 1 g/min, from 0.2 g/min to 0.9 g/min, from 0.2 g/min to 0.8 g/min, from 0.2 g/min to 0.7 g/min, from 0.2 g/min to 0.6 g/min, from 0.2 g/min to 0.5 g/min, from 0.2 g/min to 0.4 g/min, or even from 0.2 g/min to 0.3 g/min. It is envisioned that the flow rate of the liquid product stream from the slurry-phase reactor zone may be from any of the lower limits disclosed herein to any of the upper limits disclosed herein. Any convenient apparatus for controlling the flow rate, such as a liquid pump, may be used. Without intending to be bound by any particular theory, it is believed that a flow rate of the liquid product stream from the slurry-phase reactor zone less than 0.2 g/min may not allow sufficient levels of the liquid product stream into the reactor. However, a flow rate greater than 1 g/min may cause too much of the liquid product stream to circulate within the system, such that an unacceptable amount of the liquid product stream remains unreacted upon exiting the reactor.

In embodiments, the second reactor in the fixed-bed reactor zone may be operated at a temperature from 350° C. to 450° C., such as from 360° C. to 450° C., from 370° C. to 450° C., from 380° C. to 450° C., from 390° C. to 450° C., from 400° C. to 450° C., from 410° C. to 450° C., from 420° C. to 450° C., from 430° C. to 450° C., from 440° C. to 450° C., from 350° C. to 440° C., from 350° C. to 430° C., from 350° C. to 420° C., from 350° C. to 410° C., from 350° C. to 400° C., from 350° C. to 390° C., from 350° C. to 380° C., from 350° C. to 370° C., or even from 350° C. to 360° C. It is envisioned that the temperature may be from any of the lower limits disclosed herein to any of the upper limits disclosed herein. The temperature within the fixed-bed reactor may be, but need not be, the same as the temperature within the slurry-phase reactor. Without intending to be bound by any particular theory, it is believed that having a reactor temperature below 350° C. may cause one or more of the selective hydrogenation, selective opening of the saturated ring, and then further hydro-dealkylation, trans-alkylation, and disproportionation to proceed too slowly to be commercially viable, but having a reactor temperature above 450° C. may cause one or more of these reactions to proceed too quickly, which may lead to a runaway reaction or premature deactivation of the catalyst.

In embodiments, the second reactor in the fixed-bed reactor zone may be operated at a pressure from 3 MPa to 18 MPa, from 3.5 MPa to 18 MPa, from 4 MPa to 18 MPa, from 4.5 MPa to 18 MPa, from 5 MPa to 18 MPa, from 5.5 MPa to 18 MPa, from 6 MPa to 18 MPa, from 6.5 MPa to 18 MPa, from 7 MPa to 18 MPa, from 7.5 MPa to 18 MPa, from 8 MPa to 18 MPa, from 8.5 MPa to 18 MPa, from 9 MPa to 18 MPa, from 9.5 MPa to 18 MPa, from 10 MPa to 18 MPa, from 10.5 MPa to 18 MPa, from 11 MPa to 18 MPa, from 11.5 MPa to 18 MPa, from 12 MPa to 18 MPa, from 12.5 MPa to 18 MPa, from 13 MPa to 18 MPa, from 13.5 MPa to 18 MPa, from 14 MPa to 18 MPa, from 14.5 MPa to 18 MPa, from 15 MPa to 18 MPa, from 15.5 MPa to 18 MPa, from 16 MPa to 18 MPa, from 3 MPa to 17.5 MPa, from 3 MPa to 17 MPa, from 3 MPa to 16.5 MPa, from 3 MPa to 16 MPa, from 3 MPa to 15.5 MPa, from 3 MPa to 15 MPa, from 3 MPa to 14.5 MPa, from 3 MPa to 14 MPa, from 3 MPa to 13.5 MPa, from 3 MPa to 13 MPa, from 3 MPa to 12.5 MPa, from 3 MPa to 12 MPa, from 3 MPa to 11.5 MPa, from 3 MPa to 11 MPa, from 3 MPa to 10.5 MPa, from 3 MPa to 10 MPa, from 3 MPa to 9.5 MPa, from 3 MPa to 9 MPa, from 3 MPa to 8.5 MPa, from 3 MPa to 8 MPa, from 3 MPa to 7.5 MPa, from 3 MPa to 7 MPa, from 3 MPa to 6.5 MPa, from 3 MPa to 6 MPa, from 3 MPa to 5.5 MPa, or even from 3 MPa to 5 MPa. It is envisioned that the pressure may be from any of the lower limits disclosed herein to any of the upper limits disclosed herein. The pressure within the fixed-bed reactor may be, but need not be, the same as the pressure within the slurry-phase reactor. Without intending to bound by any particular theory, it is believed that a pressure below 3 MPa may be insufficient for one or more of the selective hydrogenation, selective opening of the saturated ring, and then further hydro-dealkylation, trans-alkylation, and disproportionation to take place. However, at a pressure above 18 MPa, specialized high-pressure equipment may become necessary, which would increase the cost of performing the reaction.

The fixed-bed reactor includes a mesoporous zeolite-supported metal catalyst. Generally, zeolites may be characterized by a framework type which defines their microporous structure. The zeolites described presently, in one or more embodiments, are not particularly limited by framework type. Framework types are described in, for example, "Atlas of Zeolite Framework Types" by Ch. Baerlocher et al, Fifth Revised Edition, 2001, which is incorporated by reference herein. In embodiments, the zeolites may comprise microstructures (which include micropores) characterized as, among others, *BEA framework type zeolites (such as, but not limited to, zeolite Beta), FAU framework type zeolites (such as, but not limited to, zeolite Y), MOR framework type zeolites, or MFI framework type zeolite (such as, but not limited to, ZSM-5). It should be understood that *BEA, MFI, MOR, and FAU refer to zeolite framework types as identified by their respective three letter codes established by the International Zeolite Association (IZA). Other framework types are contemplated in the presently disclosed embodiments. In embodiments, the mesoporous zeolite of the catalyst may be zeolite Beta, ZSM-5, Mordenite, Zeolite Y, and combinations of two or more thereof. The metal of the catalyst may be derived from a heteropolyacid. Exemplary heteropolyacids include Keggin-type heteropolyacids, such as one or more of phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$).

After the intermediate products of the liquid phase are contacted with the mesoporous zeolite-supported metal catalyst in the fixed-bed reactor zone, a gaseous phase and a liquid phase are produced. The gaseous phase and liquid phase may be separated from one another using a liquid/gas separator. The gaseous phase may be vented or collected. Conveniently, the gaseous phase may be analyzed prior to collection or venting so the material balance before and after the reaction may be calculated. The liquid phase, which includes the BTEX, may be cooled using, for example, a heat exchanger and then collected.

In embodiments, from 50% to 75% of the pyrolysis oil may be converted to BTEX ("the overall yield"). For instance, the overall yield may be from 51% to 75%, from 52% to 75%, from 53% to 75%, from 54% to 75%, from 55% to 75%, from 56% to 75%, from 57% to 75%, from 58% to 75%, from 59% to 75%, from 60% to 75%, from 61% to 75%, from 62% to 75%, from 63% to 75%, from 64% to 75%, from 65% to 75%, from 66% to 75%, from 67% to 75%, from 68% to 75%, from 69% to 75%, from 70% to 75%, from 50% to 74%, from 50% to 73%, from 50% to 72%, from 50% to 71%, from 50% to 70%, from 50% to 69%, from 50% to 68%, from 50% to 67%, from 50% to 66%, from 50% to 65%, from 50% to 64%, from 50% to 63%, from 50% to 62%, from 50% to 61%, from 50% to 60%, from 50% to 59%, from 50% to 58%, from 50% to 57%, from 50% to 56%, or even from 50% to 55%. It is envisioned that the overall yield may be from any of the lower limits disclosed herein to any of the upper limits disclosed herein.

The embodiments described herein may help to limit aromatic content in fuels, thereby helping to protect the environment. Further, the embodiments enable production of aromatic compounds, which are valued in industry as intermediates, under relatively mild conditions. For instance, pyrolysis oil can now be used as a feedstock to produce para-xylene, which is a well-known intermediate for the production of PTA.

According to a first aspect, either alone or in combination with any other aspect, a multi-stage process for upgrading pyrolysis oil comprising polyaromatic compounds to benzene, toluene, ethylbenzene, and xylenes (BTEX) includes upgrading the pyrolysis oil in a slurry-phase reactor zone to produce intermediate products, wherein the slurry-phase reactor zone comprises a mixed metal oxide catalyst; and hydrocracking the intermediate products in a fixed-bed reactor zone to produce the BTEX, wherein the fixed-bed reactor zone comprises a mesoporous zeolite-supported metal catalyst.

According to a second aspect, either alone or in combination with any other aspect, the slurry-phase reactor zone is operated at a temperature from 350° C. to 450° C.

According to a third aspect, either alone or in combination with any other aspect, the slurry-phase reactor zone is operated at a pressure from 3 MPa to 18 MPa.

According to a fourth aspect, either alone or in combination with any other aspect, the mixed metal oxide catalyst comprises two or more of $Fe_2O_3$, $ZrO_2$, $CeO_2$, $Al_2O_3$, $TiO_2$, $MoO_3$, $Co_2O_3$, and NiO.

According to a fifth aspect, either alone or in combination with any other aspect, the mixed metal oxide catalyst comprises: from 70 wt. % to 90 wt. % $Fe_2O_3$; from 5 wt. % to 60 wt. % $ZrO_2$; from 1 wt. % to 4 wt. % $CeO_2$; and from 5 wt. % to 10 wt. % $Al_2O_3$, where wt. % is calculated based on the total amount of oxides.

According to a sixth aspect, either alone or in combination with any other aspect, the mixed metal oxide catalyst comprises: from 10 wt. % to 50 wt. % $TiO_2$; from 10 wt. % to 15 wt. % $MoO_3$; from 1 wt. % to 10 wt. % $Co_2O_3$; and from 1 wt. % to 5 wt. % NiO, where wt. % is calculated based on the total amount of oxides.

According to a seventh aspect, either alone or in combination with any other aspect, the fixed-bed reactor zone is operated at a temperature from 350° C. to 450° C.

According to an eighth aspect, either alone or in combination with any other aspect, the fixed-bed reactor zone is operated at a pressure from 3 MPa to 18 MPa.

According to a ninth aspect, either alone or in combination with any other aspect, the metal of the mesoporous zeolite-supported metal catalyst comprises a heteropolyacid.

According to a tenth aspect, either alone or in combination with any other aspect, the heteropolyacid comprises at least one Keggin-type heteropolyacid selected from the group consisting of phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof.

According to an eleventh aspect, either alone or in combination with any other aspect, the zeolite support comprises a zeolite selected from the group consisting of zeolite Beta, ZSM-5, Mordenite, Zeolite Y, and combinations of two or more thereof.

According to a twelfth aspect, either alone or in combination with any other aspect, the polyaromatic compounds comprise $C_{16}$ and greater polyaromatic compounds.

According to a thirteenth aspect, either alone or in combination with any other aspect, greater than or equal to 95% of the $C_{16}$ and greater polyaromatic compounds are converted to BTEX in the multi-stage process.

According to a fourteenth aspect, either alone or in combination with any other aspect, BTEX yield from the polyaromatic compounds, as a percentage of the amount of polyaromatic compounds, is from 50% to 70%.

According to a fifteenth aspect, either alone or in combination with any other aspect, the intermediate products are selected from the group consisting of naphthalene, tetralin, benzene substituted with straight-chain or branched hydrocarbon substituents, and a combination of two or more thereof.

EXAMPLES

Using embodiments described above, an exemplary scheme for producing BTEX was performed.

Synthesis of Mixed Metal Oxide Catalyst

An exemplary mixed metal oxide catalyst was formulated to have a composition of 83 wt. % $Fe_2O_3$, 7.5 wt. % $ZrO_2$, 2.5 wt. % $CeO_2$, and 7 wt. % $Al_2O_3$, with the concentration calculated on an oxide basis. $Fe(NO_3)_3 \cdot 9H_2O$ (40 g) was dissolved in 800 ml distilled water to form solution A. $Al(NO_3)_3 \cdot 9H_2O$ (4.906 g), $ZrO(NO_3)_2$ (1.549 g), and $Ce(NO_3)_3 \cdot 6H_2O$ (0.601 g) were added to solution A to produce solution B, which was stirred for 30 min. An ammonium hydroxide solution (40 ml, 28%-30% $NH_3$ basis) was mixed with 60 ml distilled water to produce solution C. Solution B was titrated to a pH of 7 by gradual addition of solution C. The properly titrated solution was mixed for one hour, thereby forming a precipitate. The precipitate was isolated and dried at overnight in an over. The dried solid was then calcined in air at 500° C. for two hours. The calcined product was crushed to obtain the final mixed metal oxide catalyst as a powder.

Synthesis of Mesoporous Zeolite-Supported Metal Catalyst

Preparation of a Hierarchical Beta-M(50) Zeolite

Micrometer-sized zeolite Beta with a $SiO_2/Al_2O_3$ ratio of 28 (22.2 g, HSZ-931 HOA, Tosoh Corp.) was added to 600 ml 0.2 M NaOH solution. This mixture underwent hydrothermal desilication at 150° C. for 21 hours. The resulting hierarchical zeolite Beta had a $SiO_2/Al_2O_3$ ratio of 20 and an average mesopore size of about 10 nm. The peak mesopore size was from 20 nm to 25 nm. The mesopore size distribution was obtained by the Barrett-Joyner-Halenda (BJH) model applied to the adsorption branch of the isotherm. The total pore volume was 0.59 cc/g. The nonlocal density functional theory (NLDFT) method was applied to estimate the micropore volume and total pore volume.

A portion of the as-synthesized hierarchical zeolite Beta was ion exchanged in 0.8 M $NH_4NO_3$ at 80° C. for 2 hours three times. For example, 1 g of the zeolite was ion exchanged in 10 ml of the $NH_4NO_3$ solution. The ion exchanged zeolites were dried at 110° C. and calcined at 550° C. for 5 hours with a heating rate of 5° C./min. The calcined zeolites were mesoporous beta in H-form.

The acidity of mesoporous beta zeolites may be manipulated by dealumination in diluted nitric acid solutions. In these examples, all the dealumination was completed by a one-time treatment in 0.2 M nitric acid solutions at 80° C. for 2 hours. The dealuminated sample was ion-exchanged in 0.8 M $NH_4NO_3$ at 80° C. for 2 hours and then dried and calcined at 550° C. for 5 hours. The dealuminated mesoporous zeolite Beta (H-form) is referred to as "Beta-M (50)" in the remainder of the Examples.

Synthesis of a CoMoP/Beta-M(50) Catalyst $H_3PMo_{12}O_{40}$ (1.44 g) was dissolved in 15 ml distilled water, thereby forming solution A. $Co(NO_3)_2 \cdot 6H_2O$ was dissolved in 15 ml distilled water, thereby forming solution B. Solution A and solution B were mixed together and added to Beta-M(50) (5 g) in a round-bottom flask. The resulting mixture was stirred for 2 hours. After stirring, a vacuum was applied to the mixture at 50° C. The solid was dried overnight at 100° C. The dried solid was calcined at 500° C. for 5 hours, thereby providing the CoMoP/Beta-M(50) catalyst.

The CoMoP/Beta-M(50) catalyst was pretreated prior to use in the process. To pretreat, the catalyst was added to the fixed-bed reactor, which was then heated to 400° C. at a heating rate of 5° C./min under a hydrogen flow of 25 ml/min and atmospheric pressure. Once the reactor temperature reached 400° C., the reactor was pressurized with hydrogen gas to 3 MPa, and the hydrogen flow was then maintained at a rate of 25 ml/min.

Obtaining BTEX from Pyrolysis Oil

Raw pyrolysis oil (16.74 g) was mixed with toluene (4.37 g) to form the pyrolysis oil feed. The pyrolysis oil feed and mixed metal oxide catalyst (12.17 g), prepared as above, were added to a slurry reactor. The mixture was stirred at 400° C. and 14 MPa for 4 hours. After the reaction, the mixture was sent to a separator to separate the gas product, the liquid product, and the solid used mixed metal oxide catalyst. The used mixed metal oxide catalyst was washed with toluene to remove possible condensate, and vacuum dried from 20° C. to 100° C.

The liquid product was fed to the fixed-bed reactor containing 0.5 g of the pretreated CoMoP/Beta-M(50) catalyst at a feed rate of 0.6 g/hour. The reactor temperature was maintained at 400° C. and 3 MPa. The hydrogen flow was maintained at a rate of 25 ml/min, and the reaction was allowed to proceed for 24 hours.

After passing through both the slurry-phase reactor and the fixed-bed reactor, 61.2% of pyrolysis oil was converted to BTEX. The overall yield of various products is provided in Table 1.

TABLE 1

Overall Net Yield of Products After Two-Stage Process

| Product | Yield (%) |
| --- | --- |
| Gas | 1.4 |
| Benzene | 8.9 |
| Toluene | 36.0 |
| Xylenes | 16.3 |
| $C_9$ aromatics | 10.4 |
| $C_{10}$-$C_{11}$ aromatics | 22.6 |
| Loss (Heavy Fuel Oil) | 4.4 |

It is noted that recitations in the present disclosure of a component of the present disclosure being "operable" or "sufficient" in a particular way, to embody a particular property, or to function in a particular manner, are structural recitations, as opposed to recitations of intended use. More specifically, the references in the present disclosure to the manner in which a component is "operable" or "sufficient" denotes an existing physical condition of the component and, as such, is to be taken as a definite recitation of the structural characteristics of the component.

The singular forms "a," "an" and "the" include plural referents, unless the context clearly dictates otherwise.

Throughout this disclosure ranges are provided. It is envisioned that each discrete value encompassed by the ranges are also included. Additionally, the ranges which may be formed by each discrete value encompassed by the explicitly disclosed ranges are equally envisioned.

As used in this disclosure and in the appended claims, the words "comprise," "has," and "include" and all grammatical variations thereof are each intended to have an open, non-limiting meaning that does not exclude additional elements or steps.

As used in this disclosure, terms such as "first" and "second" are arbitrarily assigned and are merely intended to differentiate between two or more instances or components. It is to be understood that the words "first" and "second" serve no other purpose and are not part of the name or description of the component, nor do they necessarily define a relative location, position, or order of the component. Furthermore, it is to be understood that the mere use of the term "first" and "second" does not require that there be any "third" component, although that possibility is contemplated under the scope of the present disclosure.

Having described the subject matter of the present disclosure in detail and by reference to specific embodiments, it is noted that the various details disclosed in the present disclosure should not be taken to imply that these details relate to elements that are essential components of the various embodiments described in the present disclosure. Further, it will be apparent that modifications and variations are possible without departing from the scope of the present disclosure, including, but not limited to, embodiments defined in the appended claims.

What is claimed is:

1. A multi-stage process for upgrading pyrolysis oil comprising polyaromatic compounds to benzene, toluene, ethylbenzene, and xylenes (BTEX), the method comprising:
   upgrading the pyrolysis oil in a slurry-phase reactor zone to produce intermediate products, wherein the slurry-phase reactor zone comprises a mixed metal oxide catalyst; and
   hydrocracking the intermediate products in a fixed-bed reactor zone to produce the BTEX, wherein the fixed-bed reactor zone comprises a mesoporous zeolite-supported metal catalyst.

2. The multi-stage process of claim 1, wherein the slurry-phase reactor zone is operated at a temperature from 350° C. to 450° C.

3. The multi-stage process of claim 1, wherein the slurry-phase reactor zone is operated at a pressure from 3 MPa to 18 MPa.

4. The multi-stage process of claim 1, wherein the mixed metal oxide catalyst comprises two or more of $Fe_2O_3$, $ZrO_2$, $CeO_2$, $Al_2O_3$, $TiO_2$, $MoO_3$, $Co_2O_3$, and NiO.

5. The multi-stage process of claim 1, wherein the mixed metal oxide catalyst comprises:
from 70 wt. % to 90 wt. % $Fe_2O_3$;
from 5 wt. % to 60 wt. % $ZrO_2$;
from 1 wt. % to 4 wt. % $CeO_2$; and
from 5 wt. % to 10 wt. % $Al_2O_3$,
where wt. % is calculated based on the total amount of oxides.

6. The multi-stage process of claim 1, wherein the mixed metal oxide catalyst comprises:
from 10 wt. % to 50 wt. % $TiO_2$;
from 10 wt. % to 15 wt. % $MoO_3$;
from 1 wt. % to 10 wt. % $Co_2O_3$; and
from 1 wt. % to 5 wt. % NiO,
where wt. % is calculated based on the total amount of oxides.

7. The multi-stage process of claim 1, wherein the fixed-bed reactor zone is operated at a temperature from 350° C. to 450° C.

8. The multi-stage process of claim 1, wherein the fixed-bed reactor zone is operated at a pressure from 3 MPa to 18 MPa.

9. The multi-stage process of claim 1, wherein the metal of the mesoporous zeolite-supported metal catalyst comprises a heteropolyacid.

10. The multi-stage process of claim 9, wherein the heteropolyacid comprises at least one Keggin-type heteropolyacid selected from the group consisting of phosphortungstic heteropolyacid ($H_3PW_{12}O_{40}$), phosphormolybdic heteropolyacid ($H_3PMo_{12}O_{40}$), silicotungstic heteropolyacid ($H_4SiW_{12}O_{40}$), silicomolybdic heteropolyacid ($H_4SiMo_{12}O_{40}$), and combinations thereof.

11. The multi-stage process of claim 9, wherein the zeolite support comprises a zeolite selected from the group consisting of zeolite Beta, ZSM-5, Mordenite, Zeolite Y, and combinations of two or more thereof.

12. The multi-stage process of claim 1, wherein the polyaromatic compounds comprise $C_{16}$ and greater polyaromatic compounds.

13. The multi-stage process of claim 12, wherein greater than or equal to 95% of the $C_{16}$ and greater polyaromatic compounds are converted to BTEX in the multi-stage process.

14. The multi-stage process of claim 1, wherein BTEX yield from the polyaromatic compounds, as a percentage of the amount of polyaromatic compounds, is from 50% to 70%.

15. The multi-stage process of claim 1, wherein the intermediate products are selected from the group consisting of naphthalene, tetralin, benzene substituted with straight-chain or branched hydrocarbon substituents, and a combination of two or more thereof.

* * * * *